(12) United States Patent
Alvarez (10) Patent No.: US 11,659,959 B2
(45) Date of Patent: *May 30, 2023

(54) MEAT INJECTOR

(71) Applicant: Michael J. Alvarez, Huntsville, AL (US)

(72) Inventor: Michael J. Alvarez, Huntsville, AL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/832,968

(22) Filed: Jun. 6, 2022

(65) Prior Publication Data

US 2022/0296045 A1    Sep. 22, 2022

Related U.S. Application Data (63) Continuation of application No. 16/225,175, filed on Dec. 19, 2018, now Pat. No. 11,350,793.

(51) Int. Cl.
| | | |
|---|---|---|
| *A47J 43/00* | (2006.01) | |
| *A47J 43/16* | (2006.01) | |
| *A22C 9/00* | (2006.01) | |
| *A23L 13/72* | (2023.01) | |
| *A22C 17/00* | (2006.01) | |

(52) U.S. Cl.
CPC .............. *A47J 43/16* (2013.01); *A22C 9/001* (2013.01); *A22C 17/0053* (2013.01); *A23L 13/72* (2016.08)

(58) Field of Classification Search
CPC ........... A22C 9/00; A22C 9/001; A22C 17/00; A22C 17/0053; A23L 13/00; A23L 13/70; A23L 13/72; Y02A 40/946
USPC ............................................ 99/432; 452/141
See application file for complete search history.

(56) References Cited

U.S. PATENT DOCUMENTS

| | | | |
|---|---|---|---|
| 1,124,851 A | 1/1915 | Burkle | |
| 3,344,731 A | 10/1967 | Trees | |
| 3,718,083 A | 2/1973 | Walters | |
| 3,734,001 A | 5/1973 | Poster | |
| 3,916,777 A | 11/1975 | Earl | |
| 3,955,490 A | 5/1976 | North | |
| 4,254,700 A * | 3/1981 | Fleming | A22C 9/001 99/535 |
| 4,411,047 A | 10/1983 | Norton | |
| 5,272,964 A | 12/1993 | Ostergaard | |

(Continued)

FOREIGN PATENT DOCUMENTS

| | | |
|---|---|---|
| FR | 1282031 | 12/1960 |
| GB | 1 410 174 | 10/1975 |
| WO | 2015/054144 | 4/2015 |

OTHER PUBLICATIONS

Spitjack, "Commercial Brine Pump and Meat Injection System", retrieved Dec. 26, 2013 from http://spitjack.com/product.

(Continued)

*Primary Examiner* — Richard T Price, Jr.
(74) *Attorney, Agent, or Firm* — Bradley Arant Boult Cummings LLP (57) ABSTRACT

A handheld injector is provided for injecting liquid, such as flavoring or basting material, into meat or poultry. The injector includes a pistol-shaped housing which encloses a battery-powered motor for constant-rate delivery of liquid from a peristaltic pump. The injector also includes a fluid conduit within the housing through which liquid is pumped from a reservoir of liquid to a needle for injection into the meat.

20 Claims, 5 Drawing Sheets

(56) References Cited

U.S. PATENT DOCUMENTS

| | | | |
|---|---|---|---|
| 5,638,872 | A | 6/1997 | Porter |
| 6,578,470 | B2 | 6/2003 | Backus et al. |
| 6,632,463 | B1 | 10/2003 | Townsend |
| 6,782,803 | B2 | 8/2004 | Hutzler |
| 8,048,461 | B2 | 11/2011 | Cozzini |
| D878,877 | S | 3/2020 | Alvarez et al. |
| 11,079,367 | B2 | 8/2021 | Lipsey |
| 2006/0150831 | A1 | 7/2006 | Francis et al. |
| 2006/0188623 | A1 | 8/2006 | Houtz et al. |
| 2010/0105307 | A1 | 4/2010 | Zimmerman |
| 2011/0297014 | A1 | 12/2011 | Patel |
| 2012/0270485 | A1 | 10/2012 | Doyle |
| 2013/0291799 | A1 | 11/2013 | Nadreau et al. |
| 2019/0327982 | A1 | 10/2019 | Bok et al. |
| 2021/0112819 | A1 | 4/2021 | Hetherington |

OTHER PUBLICATIONS

BBQ Injector, "NoCents 1 gallon Pump / power injector Delux", retrieved Dec. 26, 2013 from http://www.bbqinjector.com/cart.html.
Walmart, "Bulk Buys Basting Gun with injector—Pack of 6", retrieved Dec. 19, 2013 from http://www.walmart.com.
The Pork Injector, "Stop Soaking; Start Injecting", retrieved Dec. 26, 2013 from http://www.porkinjector.com.
Polyscience, "The Smoking Gun Handheld Food Smoker" manual.
International Search Report and Written Opinion dated Feb. 19, 2020 of corresponding International Application No. PCT/US2019/062729.
European Search Report dated Sep. 5, 2022 of corresponding European Patent Application No. 19901134.7.

\* cited by examiner

MEAT INJECTOR

REFERENCE TO RELATED APPLICATIONS

This application is a continuation of, and claims priority to, U.S. Non-Provisional application Ser. No. 16/225,175, filed Dec. 19, 2018 and titled "Meat Injector," now U.S. Pat. No. 11,350,793, which is hereby incorporated by reference.

FIELD OF THE DISCLOSURE

The present disclosure relates generally to a meat injector. More particularly, the disclosure relates to a handheld battery-operated injector for delivering, by injection, a constant flow of flavoring or basting material to meat and/or poultry.

BACKGROUND AND SUMMARY

Mechanically or chemically tendering and adding flavor to meat by pounding, piercing, injecting, marinating, or basting has been a practice for quite some time. Meat injecting in particular has been a popular and efficient way to add flavor and moisture to different types of meat and poultry. Meat injection is advantageous in that it allows flavor to penetrate deep into the meat (as opposed to marinades and rubs that flavor only the surface of the meat) and does not require long wait times to add flavors like a marinade does.

The present disclosure describes a handheld meat injector having an improved pump that provides for a steady and continuous flow of liquid (for example, basting or flavoring material) into the meat and dispenses of the need of a power outlet or cord. The meat injector according to the present disclosure has a housing comprising a nozzle portion and a handle integral therewith. A needle is removably coupled to the nozzle portion. An internal conduit is disposed within the housing and is in fluid communication with the needle. The internal conduit is also configured for fluid communication with a liquid reservoir external to the housing. A pump within the housing comprises a plurality of rollers mounted on a rotatable carrier for carrying the rollers in a substantially circular path, the rollers positioned for engagement with the internal conduit. The pump further comprises a pump cover positioned over the plurality of rollers and configured to compress the internal conduit as the rotatable carrier carries the plurality of rollers in the substantially circular path. A trigger on the handle, when actuated, causes the pump to deliver liquid from the reservoir and discharge the liquid out of the needle.

BRIEF DESCRIPTION OF THE DRAWINGS

Further features and advantages can be ascertained from the following detailed description that is provided in connection with the drawings described below.

DETAILED DESCRIPTION

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

Spatially relative terms, such as "under," "below," "lower," "over," "upper," and the like, may be used herein for ease of description to describe one element or feature's relationship to another when the apparatus is right side up as shown in the accompanying drawings.

The present disclosure provides a handheld injector for tenderizing and flavoring meat and poultry by injecting the meat and poultry with a basting or flavoring material, such as a marinade or seasoning. The injector described herein utilizes a peristaltic pump to provide a continuous and steady flow of liquid into the meat. The present injector is also battery-powered, which dispenses of the need for a power cord or outlet to operate the injector. Moreover, the various components of the injector described herein are constructed or manufactured from completely food safe materials.

Figure 1:
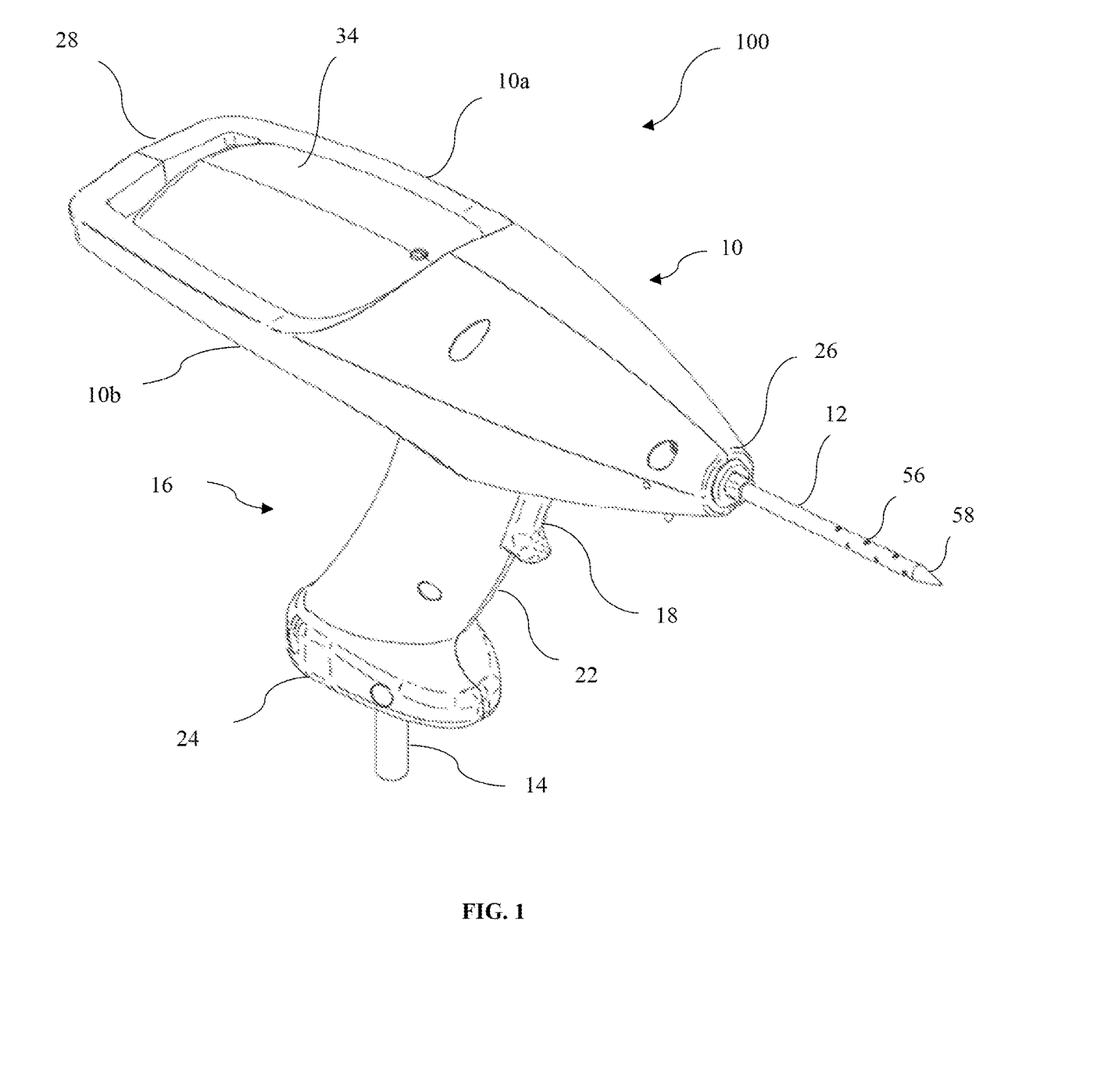
FIG. 1 is a front perspective view of an injector in accordance with an exemplary embodiment the present disclosure.

FIG. 1 is a front perspective view an injector 100 according to an exemplary embodiment of the present disclosure. The injector 100 comprises a housing 10. At a forward end 26, or nozzle portion, of the injector 100, the housing 10 engages a needle 12 for injection of a liquid (not shown) into meat (not shown). The housing 10 also comprises a handle 16. The handle 16 is configured to fit the palm of the hand of a user (not shown). A forward surface 22 of the handle 16 includes a trigger 18 to control the flow of liquid through the needle 12. A bottom end 24 of the handle 16 comprises an external fluid conduit 14 that extends into a reservoir of liquid (not shown). On its upper end, the external conduit joins with interior conduit (not shown) that passes through a pump (not shown) and to the needle 12. In this regard, the external conduit 14 and the internal conduit together form a fluid connection between liquid in the reservoir and the needle, when the trigger 18 is actuated.

Figure 2:
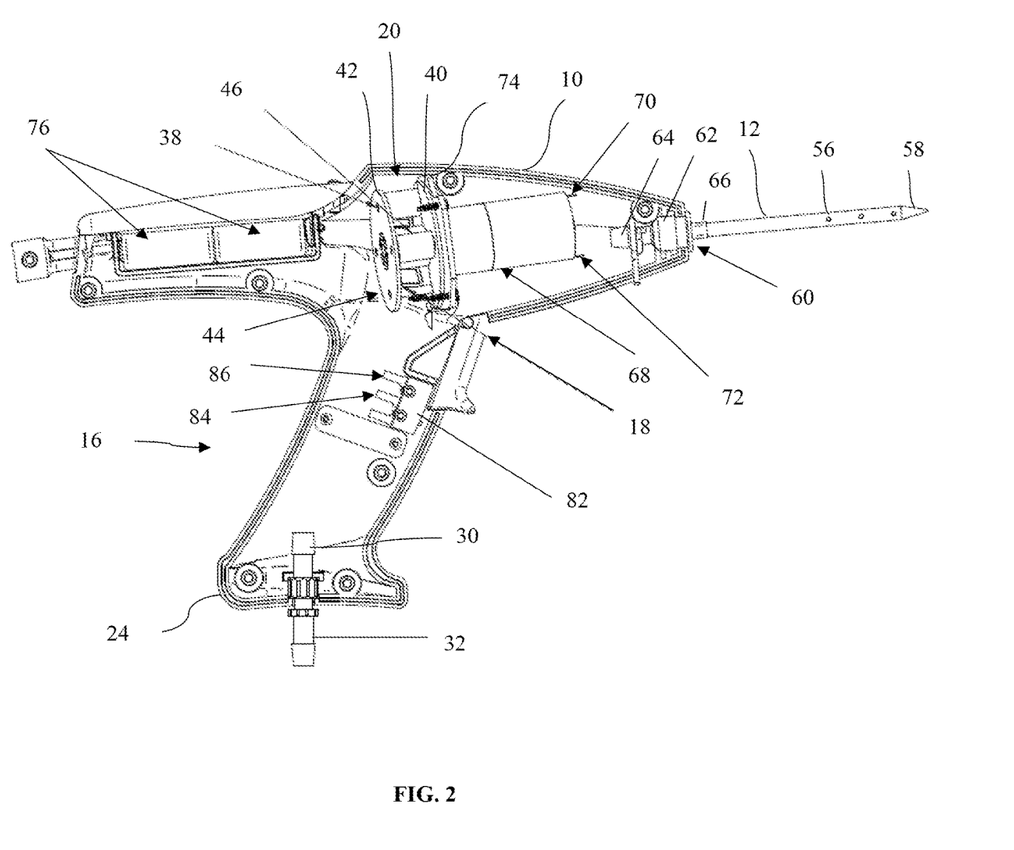
FIG. 2 is a partially-cross-sectional view of the injector of FIG. 1, without the internal conduit.
Figure 3:
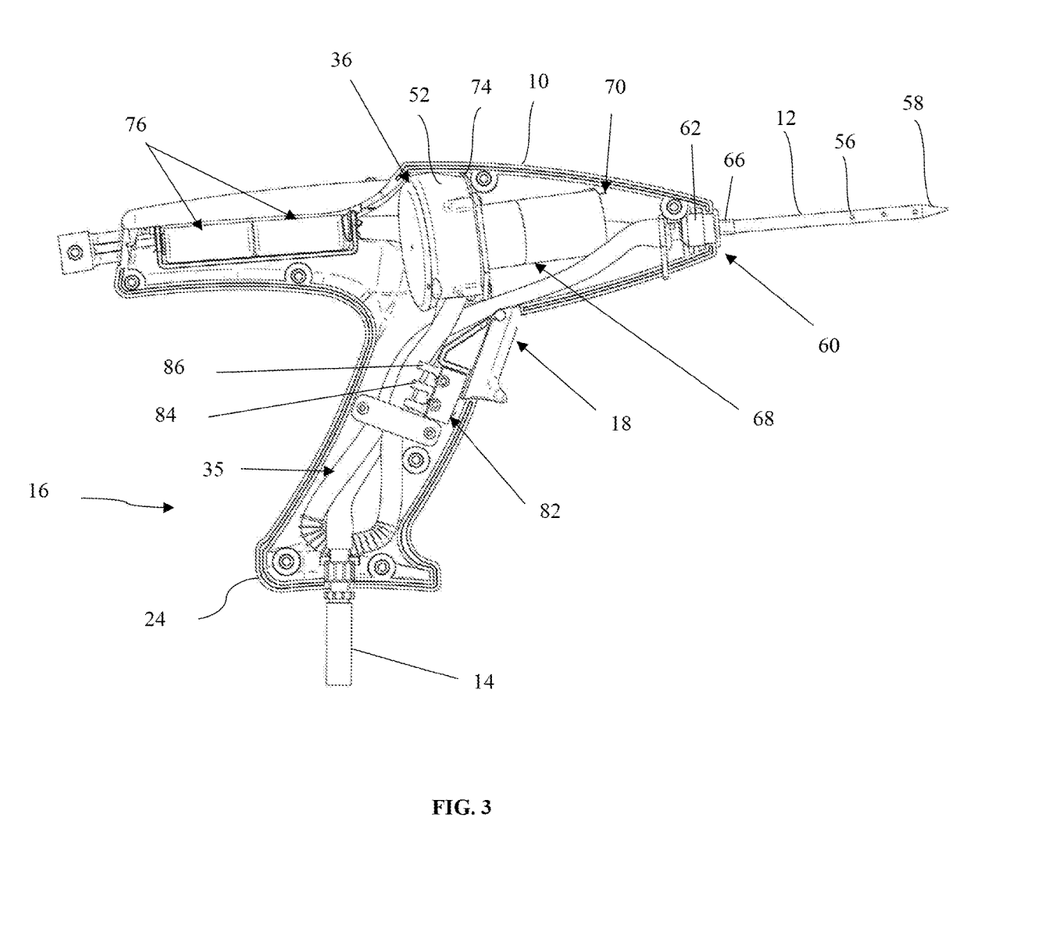
FIG. 3 depicts the injector of FIG. 2 with the internal conduit.

On a rearward end 28, the housing 10 also comprises a removable battery cover 34 the covers a battery compartment (not shown). The battery cover 34 provides for easy access to one or more batteries disposed within the battery compartment. When assembled together, the housing 10 and the needle 12, along with the handle 16 and the trigger 18, may form a pistol-shape. This configuration provides for firm hold control and convenient handleability.

However, one of ordinary skill in the art will recognize that the housing 10 may have other shapes or configurations suitable for injecting fluid into meat. The housing 10 may be formed from any suitable rigid material such as aluminum, stainless steel, and plastic.

In the illustrated embodiment, the housing 10 is constructed as two halves. For example, as shown in FIG. 1, the housing 10 is composed of a right housing 10a and a left housing 10b that are substantially identically shaped and that mate to form the main housing 10. Providing a housing 10 with two halves provides for easier accessibility to parts on the interior of the housing 10. The right housing 10a is provided with securing means that correspond with openings in the left housing 10b. The right housing 10a and the left housing 10b may be secured to each other by any suitable means including, but not limited, by screws, pins, projections, tongue and groove solutions, snap catch elements, or permanent securing with welding, gluing, or adhesives.

The size of housing 10 may vary. In an exemplary embodiment, the housing 10 may have a length of about 7 inches to about 12 inches. In another embodiment, the housing 10 may have a length of about 9 inches to about 11 inches. For example, the length of the housing 10 may be about 9.77 inches. The housing 10 may have a height of about 4 inches to about 9 inches. In another embodiment, the housing 10 may have a height of about 5 inches to about 7 inches. For instance, the height of the housing 10 may be about 6.49 inches. However, one of ordinary skill in the art will recognize that the exemplary dimensions provided herein are for illustrative purposes, and that exemplary injectors are not limited to the illustrative dimensions.

FIG. 2 is a partially-cross-sectional view of the injector 100 of FIG. 1, showing the internal arrangement of the injector, without the internal conduit (not shown) installed. The internal conduit provides a pathway for liquid to flow through the injector 100 from an inner luer connection 30, through a pump 20, and out via the needle 12, as further discussed herein.

The housing 10 includes at least one internal conduit (not shown) that provides a pathway for liquid from a reservoir (not shown) to flow through the interior of housing 10 and out through needle 12. That is, the internal conduit extends through the interior of the housing 10 to provide a pathway for the flow of liquid. The internal conduit may be coupled to and in fluid communication with a reservoir of liquid, for example, basting or flavoring material. In the illustrated embodiment, the internal conduit is coupled to the external fluid conduit 14, which extends outwardly from the bottom end 24 of handle 18 to form a fluid attachment with the reservoir. In another embodiment, fluid communication between the external fluid conduit 14 and the reservoir can be established through the use of one or more luer connections.

The inner luer connection 30 engages with an outer luer connection 32 at the bottom end 24 of the handle 18. The inner luer connection 30 may be, for example, a male luer connection, and the outer luer connection 32 may be, for example, a female luer connection that engages with the male luer connection. The outer luer connection 32 couples with external fluid conduit 14 that extends into the liquid reservoir (not shown), as discussed herein.

The inner and outer luer connections 30 and 32 should create a leak-free connection. In this aspect, the inner luer connection 30 may include a male Luer-Lok® connection fitting and the outer luer connection 32 may include a female Luer-Lok® fitting that screws into the male connection fitting. In another embodiment, the inner luer connection 30 and the outer luer connection 32 may be operatively attached to each other via a threaded coupling. The luer connections 30, 32 may be formed of stainless steel to prevent rusting and contamination of the fluid flowing through the external fluid conduit 14 and internal conduit (not shown).

In one embodiment, the external fluid conduit 14 and the internal conduit are composed of tubing. The type of tubing may vary; however, the tubing should be resilient, flexible, and have an internal bias that causes it to expand to a substantially circular form in cross-section when in a relaxed condition. For instance, the external fluid conduit 14 and the internal conduit may be any type of plastic tubing, such as tubing formed from ethyl vinyl acetate (EVA), polytetrafluoroethylene (PTFE), polyvinylidene fluoride (PVDF), polyethylene (PE), polypropylene (PP), polyurethane (PU), and poly-vinyl chloride (PVC). The material utilized for the external fluid conduit 14 and internal conduit should also be food safe.

Further, although the illustrated embodiments contemplate that the external fluid conduit 14 and the internal conduit are separate pieces of tubing connected by the inner and outer luer connections 30 and 32, in other embodiments the external fluid conduit 14 and internal conduit could be formed from one piece of tubing, without luer connections in between.

The housing 10 houses the pump 20 that is operatively connected to the internal conduit (not shown). The pump 20 forces the liquid from the reservoir through the internal conduit to the needle 12 for injection into the meat. Upon activation of the pump 20, fluid from the reservoir travels up through the external fluid conduit 14, through the internal conduit, to the needle 12 for injection into the meat. In the illustrated embodiment, the pump 20 is a peristaltic pump. Peristaltic pumps are advantageous in that they provide a steady flow of fluid through a conduit by pinching or squeezing the conduit along its length. In this aspect, the pump 20 advantageously provides for constant-rate delivery of a liquid into the meat.

Figure 4A:
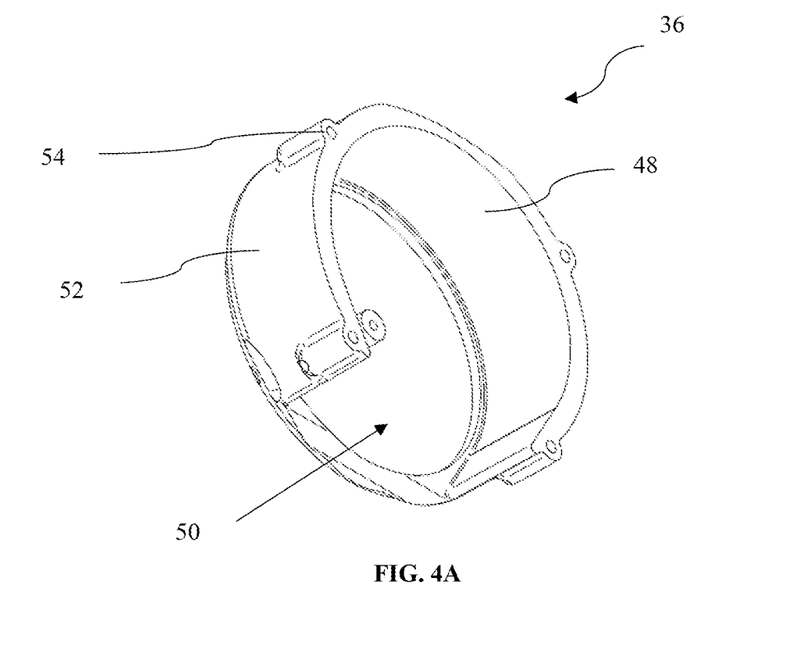
FIG. 4A is a front perspective view of a pump cover according to one embodiment of the present disclosure.
Figure 4B:
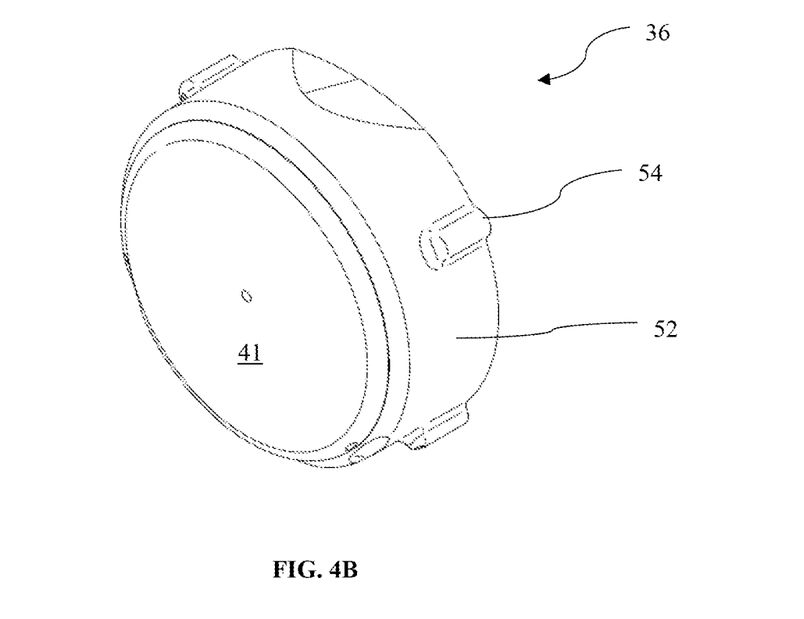
FIG. 4B is a rear perspective view of the pump cover of FIG. 4A.

The pump 20 comprises a rotor assembly 44 having a rotor 38 and a plurality of rollers 46. (The pump 20 further comprises a pump cover 36 that is illustrated in FIGS. 3, 4A, and 4B.) FIG. 2 shows an embodiment of the pump 20 without the pump cover 36, while FIG. 3 shows an embodiment of the pump 20 with the pump cover 36.

As illustrated in FIG. 2, the rotor 38 has a front panel 40, a rear panel 42, and a spacer (not shown) that interconnects the front panel 40 and the rear panel 42. The rotor 38 is provided with a plurality of rollers 46 mounted circumferentially between front panel 40 and rear panel 42. The front panel 40 and the rear panel 42 of the rotor 38 are rotatably coupled to each of the rollers 46. The number of rollers 46 in the rotor assembly 44 may vary so long as there is a sufficient number of rollers 46 to operate the pump 20. In one embodiment, the rotor 38 includes at least three rollers 46. In another embodiment, the rotor 38 includes at least four rollers 46. In still another embodiment, the rotor 38 includes at least five rollers 46. The rollers 46 may be mounted about 72 degrees to about 120 degrees apart for rotation depending on the number of rollers utilized. Further, the rollers are generally spaced equidistantly apart from one another. For example, if three rollers are used, the rollers are spaced substantially 120 degrees apart. If four rollers are used, the rollers are spaced 90 degrees apart.

The internal conduit (not shown) extends upwardly from the inner luer connection 30 at the bottom end 24 of the handle 16 and into the rotor assembly 44. Within the rotor assembly 44, the internal conduit is looped between the rollers 46 and the cover 36 (FIG. 3) in a substantially horseshoe-shaped configuration. In this regard, the internal conduit is installed within the rotor assembly 44 such that the internal conduit extends over and around the exterior of the rollers 46 in a partial loop, contained by the cover 36, and between the front panel 40 and rear panel 42 of the rotor 38.

In one embodiment, the pump 20 is powered by an electric motor 68. The motor 68 may include any type of DC motor that is capable of powering the rotor assembly 44. The motor 68 may have a positive contact 70 and a negative contact 72. The motor 68 may be positioned adjacent to the rotor assembly 44 to supply power to the pump 20. In one embodiment, the motor 68 may have a rear motor plate 74 that is attached to the front panel 40 of the rotor 38. For example, the front panel 40 of the rotor 38 may be removably mounted onto the rear motor plate 74.

The motor 68 may be powered by any suitable means. In the illustrated embodiment, the motor 68 is battery powered. In this aspect, the housing 10 houses one or more batteries 76 that are operably connected to the motor 68. The one or more batteries 76 have a positive terminal 78 and a negative terminal 80. Based on the amount of power needed to operate the peristaltic pump 20, the present disclosure contemplates the use of at least two batteries 76. In another embodiment, the injector 100 may include at least three batteries 76. In still another embodiment, the injector 100 may include at least four batteries 76. The one or more batteries 76 may be housed in the rear 28 of the housing 10 as shown in FIGS. 2 and 3. The one or more batteries 76 may also be rechargeable.

The injector 100 further includes a trigger 18 for controlling the flow of liquid from the needle 12 into the meat. The trigger 18 is positioned on a forward surface 22 of the handle 16. The trigger 18 is arranged for actuation by a finger or fingers of a user holding the injector 100. In one embodiment, the trigger 18 is operatively connected to a limit switch 82. The limit switch 82 functions to regulate the electrical circuit that controls the operation of the motor 68 when the trigger 18 is engaged. The limit switch 82 is located within the interior of housing 10 and may be positioned adjacent to the trigger 18. For instance, the limit switch 82 may be located under the trigger 18. Limit switch 82 includes a normally open (NO) terminal 84 and a common terminal (COM) 86. The COM terminal 86 is used to connect the limit switch 82 to the power source, for example, the one or more batteries 76. The NO terminal 84 prevents the electricity from flowing from the one or more batteries 76 to the pump 20 until the limit switch 82 is actuated.

Circuitry connects motorized pump 20 in series with the one or more batteries 76 and the limit switch 82. For instance, through the use of wiring, the positive battery contact 78 may be connected to the positive contact of the motor 70, the negative motor contact 72 may be connected to the NO contact 84, and the COM contact 86 may be connected to the negative battery contact 80 to create a circuit. In one embodiment, the trigger 18 actuates the limit switch 82 so that when the trigger 18 is pressed energy is supplied from the battery 76 to actuate the motorized pump 20 to thereby pump liquid from the reservoir and discharge it out the needle 12. In this aspect, when the trigger 18 is pressed, the motor 68 is activated, which electrically engages the batteries 76 with the motor 68, and the flow of liquid begins. When the user lets off the trigger 18, the trigger 18 reverts to an off position and motor 68 becomes disengaged. In this manner, the trigger 18 controls the flow of liquid through needle 14.

In operation, the user may attach a reservoir of flavoring or basting material to the outer luer connection 32 located on the bottom end 24 of handle 16. The user may attach the needle 12 to the needle fitting 60 on the forward end 26 of the housing 10. It should be noted that the needle 12 may already be attached to the housing 10 prior to attachment to the reservoir. The user may then press the needle 12 into a piece of meat to a desired depth. As the needle 12 pierces the meat, the user may activate the pump 20 by pressing the trigger 18 with one or more fingers. The flow of liquid through internal conduit 35 begins and the fluid is discharged out of the needle 12 into the meat. The pump 20 advantageously supplies a constant and continuous flow of flavoring or basting material into the meat until the user lets their finger off the trigger 18. This process may be repeated until the user is satisfied with the tenderness and basting of the meat, or until the flavoring material runs out.

FIG. 3 depicts the injector 100 of FIG. 2, with the pump cover 36 installed and showing the internal conduit 35. The internal conduit 35 extends upwardly from the bottom end 24 of the handle 16 and enters the aperture 50 of the pump cover 36. The internal conduit 35 then loops through the rotor assembly 44 (FIG. 2) to form a partial loop configuration and exits an aperture 50 of the pump cover 36. The internal conduit 35 exits the aperture 50 downwardly through the handle 16 and loops back upwardly, then extends into the forward end 26 of the housing 10 where it connects to the needle.

When the pump cover 36 is installed, the internal conduit 35 lies within the pump cover 36 and extends along the inner surface 48 (FIG. 4A) of the pump cover 50 such that the internal conduit 35 is positioned between the inner surface 48 of the pump cover 50 and the rollers 46. As shown in FIG. 3, the pump cover 36 may be mounted over the internal conduit 35 and the rotor assembly 44 using any suitable means that allows for removable attachment, such as screws, fasteners, and the like. In one embodiment, the pump cover 36 may include a plurality of openings 54 for receiving an attachment means such as a plurality of screws.

In operation, the rotor assembly 44 rotates clockwise as viewed from the front. The rollers 46 rotate in a circular path and the rollers 46 compress the internal conduit 35 against the inner surface 48 of the pump cover 36, thereby pinching the internal conduit 35 and pushing the fluid through the internal conduit 35 ahead of the rollers 46. The fluid in the portion of the internal conduit 35 between the two rollers 46 is forced along the length of the internal conduit 35 as the rollers 46 travel in a circular motion. In other words, the peristaltic pump 20 acts as a positive displacement pump where each roller 46 pumps the entire volume of the fluid contained in the segment of the internal conduit 35 between it and the next roller 46. The fluid exits from the rotor assembly 44 and travels onward to the needle 12.

As briefly discussed above, the internal conduit 35 is also in fluid communication with the needle 12. In this aspect, as the internal conduit 35 exits the pump cover 36, the internal conduit 35 extends to needle 12. In one embodiment, as the internal conduit 35 exits the pump cover 36, the internal conduit 35 extends downwardly to the bottom end 24 of handle 16 without exiting the handle 16. The internal conduit 35 forms a second horseshoe or partial loop 39 on the interior of the bottom end 24 of handle 16 and extends upwardly towards the needle 12. In this aspect, the horseshoe or partial loop configuration of the internal conduit 35 may be affixed to an interior wall of handle 16 to maintain placement of the internal conduit 35. The internal conduit 35 may be affixed to the interior wall with any means that will not constrict the flow of liquid through the internal conduit 35. For instance, in one embodiment, the internal conduit 35 may be engaged within a compression spring 37 that is affixed to the interior wall.

The housing 10 engages a needle 12 that maintains a fluid connection with the internal conduit 35 within the housing 10. The needle 12 may be an injection needle having any size, shape, and configuration suitable for piercing and injecting fluid into meat. The needle 12 includes a hollow interior configured to provide a fluid path between the internal conduit 35 and the meat. The needle 12 has a tip 58 that should be sharp enough to penetrate through several layers of meat and deliver fluid to the meat. The length of the needle 12 should be configured or selected to provide an injection depth suitable for reaching the interior of thick or dense meats. In one embodiment, the needle 12 includes one or more openings 56 in one or more sides of needle 12. In this aspect, the tip 58 of the needle 12 may be closed such that the fluid flows out from the one or more openings 56. The size of each opening 56 may vary depending on the type of meat and type of flavoring material that is to be injected. Each opening 56 should be large enough to at least allow fluid to flow out of the needle 12. In another embodiment, the tip 58 of the needle 12 may be open to allow for a flow of fluid through the tip 58.

The needle 12 may be removably attached to the housing 10. This allows for a user to interchange different types of injection needles and provides for easier cleaning. In one embodiment, at the forward end 26 of housing 10, the housing 10 may include an opening to receive a needle fitting 60. The needle fitting 60 may include an outer luer connection 62 for removably attaching the needle 12 thereto and an inner luer connection 64 for removably attaching the internal conduit 35 thereto, thereby creating a fluid connection between the internal conduit 35 and the needle 12. In this aspect, the outer luer connection 62 receives a rear end of the needle 12 and the inner luer connection 64 receives an end of the internal conduit 35. In one embodiment, the outer luer connection may include a circular protrusion 66 designed for receiving a rear end of the needle 12.

The inner luer connection 64 and the outer luer connection 62 should form a leak-free connection. In this aspect, the inner luer connection 64 may include an external thread portion and the outer luer connection 62 may include an internal thread portion complementary to the external thread portion of inner luer connection 64 to mate and join the inner luer connection 64 to the outer luer connection 62. That is, the inner luer connection 64 may be joined to the outer luer connection 64 using a screw-type connection system. The needle fitting 60 may be attached to the housing 10 by any suitable means including, but not limited to, screws, pins, projections, tongue and groove solutions, snap catch elements, and mounting brackets. In one embodiment, the outer and inner luer connections 62, 64 of needle fitting 60 may be formed of stainless steel to prevent rusting and contamination of the fluid flowing through the luer connections 62, 64.

FIG. 4A is a front perspective view of the pump cover 36. The pump cover 36 serves as a cover for the internal conduit 35 (FIG. 3) and the rotor assembly 44 (FIG. 2) and helps to maintain proper placement of the internal conduit 35. The pump cover 36 defines a generally cylindrical cavity and is formed with a circular inner surface 48 to ensure the internal conduit 35 maintains a horseshoe shape configuration. In this aspect, the pump cover 36 should be sized so as to allow the cover 36 to fit over the internal conduit 35 and rotor assembly 44. For instance, the pump cover 36 should fit over both the front panel 40 (FIG. 2) and the rear panel 42 (FIG. 2) of the rotor 38 (FIG. 2). However, the clearance between each of the rollers 46 and the inner surface 48 of the pump cover 36 should be selected such that inner and outer walls of the internal conduit 35 are compressed by the rollers 46. In one embodiment, the clearance between each of the rollers 46 and the inner surface 48 of the pump cover 36 is about 0.100 inches to about 0.125 inches. In another embodiment, the clearance between each of the rollers 46 and the inner surface 48 of the pump cover 36 is about 0.110 inches to about 0.120 inches. In still another embodiment, the clearance between each of the rollers 46 and the inner surface 48 of the pump cover 36 is about 0.115 inches to about 0.118 inches. For example, the clearance between each of the rollers 46 and the inner surface 48 of the pump cover 36 is about 0.117 inches.

The pump cover 36 may also include one or more apertures or openings 50 along the outer surface 52 to allow for the internal conduit 35 (FIG. 3) to extend in and out of the pump cover 36. In the illustrated embodiment, the pump cover 36 has a single aperture 50 along the outer surface 52 that allows for the internal conduit 35 to enter and exit the pump cover 36. In other embodiments, the pump cover 36 may include an aperture for an inlet and an aperture for an outlet along the inner surface.

FIG. 4B is a rear perspective view of the pump cover 36 of FIG. 4A. The pump cover 36 is open on its forward side, as shown in FIG. 4A. Its rearward side 41 is enclosed.

Figure 5:
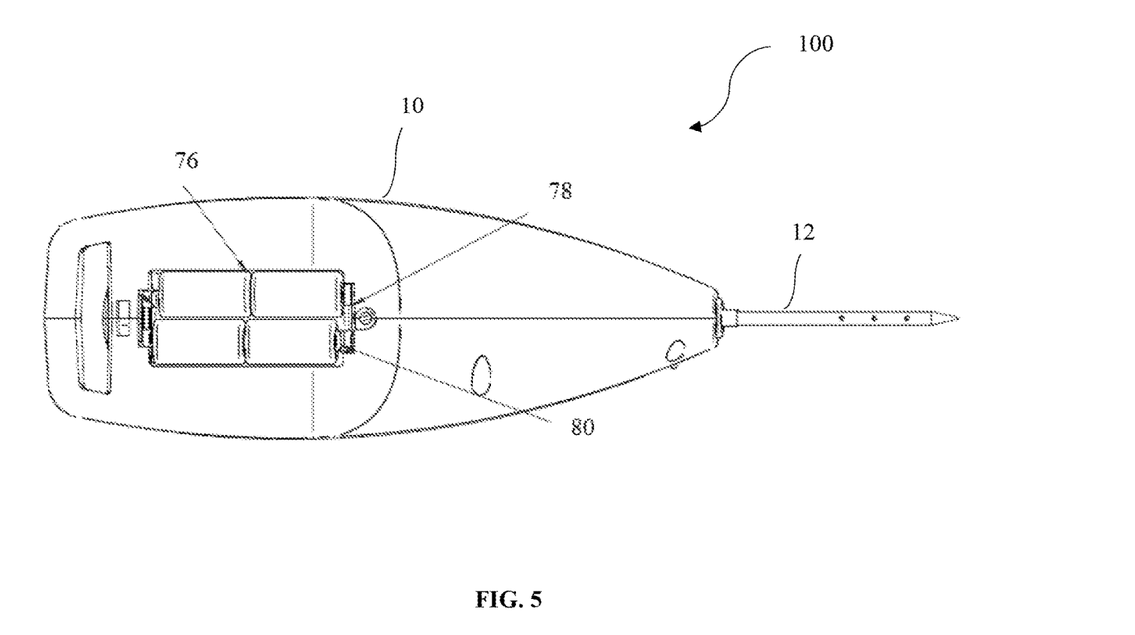
FIG. 5 is a top view of the injector of FIG. 1, without the battery cover installed.

FIG. 5 is a top plan view of the injector 100 of FIG. 1, with the battery cover removed to show batteries 76. The illustrated embodiment depicts four (4) batteries disposed in series, with two rows of two batteries side by side. Other embodiments may comprise other numbers and arrangements of batteries.

The various components of the injector 100 described herein may be constructed or manufactured from food safe materials, such as various polymers, plastics, stainless steel, aluminum, and other related food safe materials. Similarly, the various parts described herein may be constructed according to various manufacturing methods including injection molding, milling, forging, extrusion, pressing, and other related manufacturing methods.

The device described and claimed herein is not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety.

What is claimed is:

1. A handheld device for injecting fluid into meat, comprising:
   a housing comprising a nozzle portion;
   a needle coupled to the nozzle portion;
   an internal conduit disposed within the housing and in fluid communication with the needle and a liquid reservoir external to the housing;

a pump operatively connected to the internal conduit; and a trigger operatively connected to the pump, wherein the trigger is configured to actuate the pump to deliver liquid from the reservoir and discharge the liquid out of the needle.

2. The handheld device of claim 1, wherein the pump further comprises a plurality of rollers mounted on a rotatable carrier and the plurality of rollers are mounted between about 72 degrees to about 120 degrees apart on the rotatable carrier for rotation.

3. The handheld device of claim 1, further comprising an external fluid conduit extending from the liquid reservoir to the housing.

4. The handheld device of claim 1, further comprising a handle formed integrally with the housing.

5. The handheld device of claim 4, wherein the internal conduit extends from a bottom of the handle and into the pump.

6. The handheld device of claim 2, further comprising a pump cover positioned over the plurality of rollers, wherein the pump cover comprises an aperture to allow the internal conduit to enter and exit the pump.

7. The handheld device of claim 3, further comprising a male luer connection for fluid attachment of the internal conduit and a female luer connection for fluid attachment of the external fluid conduit, wherein the male luer connection and the female luer connection are operatively attached to each other to form a leak-free connection.

8. The handheld device of claim 7, wherein the male luer connection and the female luer connection are made of stainless steel.

9. A meat injector, comprising:
a housing comprising a nozzle portion;
a needle removably coupled to the nozzle portion, wherein the needle comprises a hollow interior configured to provide a fluid path between the housing and the meat;
an internal conduit disposed within the housing and in fluid communication with the needle;
an external conduit disposed outside of the housing and in fluid communication with the internal conduit and a reservoir of liquid;
a pump operatively connected to the internal conduit and configured for transferring the liquid through the internal conduit and into the meat; and
a trigger operatively connected to the pump, wherein the trigger is configured to actuate the pump to deliver liquid from the reservoir and discharge the liquid out of the needle.

10. The meat injector of claim 9, further comprising a limit switch located within the housing and operatively connected to the trigger.

11. The meat injector of claim 9, wherein the needle comprises one or more openings in a side of the needle configured to allow fluid to flow out from the needle and into the meat.

12. The meat injector of claim 9, further comprising a male luer connection for fluid attachment of the internal conduit and a female luer connection for fluid attachment of the external fluid conduit, wherein the male luer connection and the female luer connection are operatively attached to each other to form a leak-free connection.

13. The meat injector of claim 9, wherein the liquid is a consumable product.

14. The meat injector of claim 9, further comprising a motor positioned adjacent to and operably connected to the pump.

15. The meat injector of claim 9, wherein the internal conduit and the external conduit each comprise food safe tubing.

16. The meat injector of claim 9, further comprising a needle fitting removably coupled to the nozzle portion, wherein the needle fitting comprises an outer luer connection for removably attaching the needle thereto and an inner luer connection for removably attaching the internal conduit thereto, thereby creating a fluid connection between the internal conduit and the needle.

17. The meat injector of claim 16, wherein the inner luer connection comprises an external thread portion and the outer luer connection comprises an internal thread portion complementary to the external thread portion of the inner luer connection to mate and join the inner luer connection to the outer luer connection to create a fluid tight engagement.

18. The meat injector of claim 16, wherein the outer luer connection and the inner luer connection are made of stainless steel.

19. A meat injector comprising:
a nozzle portion comprising a needle configured to inject a consumable product into meat;
a handle unitary with the nozzle portion, the handle comprising a trigger;
an internal conduit disposed within the housing and in fluid communication with the needle, the internal conduit configured to be connected to a reservoir containing the consumable product;
a pump operatively connected to the internal conduit and configured for transferring the consumable product through the internal conduit and into the meat; and
a motor operably connected to the pump and the trigger, wherein, upon pressing the trigger, the motor is configured to actuate the pump to deliver the consumable product through the internal conduit to discharge the consumable product out of the needle.

20. The meat injector of claim 19, further comprising a limit switch operatively connected to the trigger and the motor.

* * * * *